May 8, 1962 D. C. SCHLUDERBERG ET AL 3,033,773
SOLID GAS SUSPENSION NUCLEAR FUEL ASSEMBLY
Filed March 29, 1960
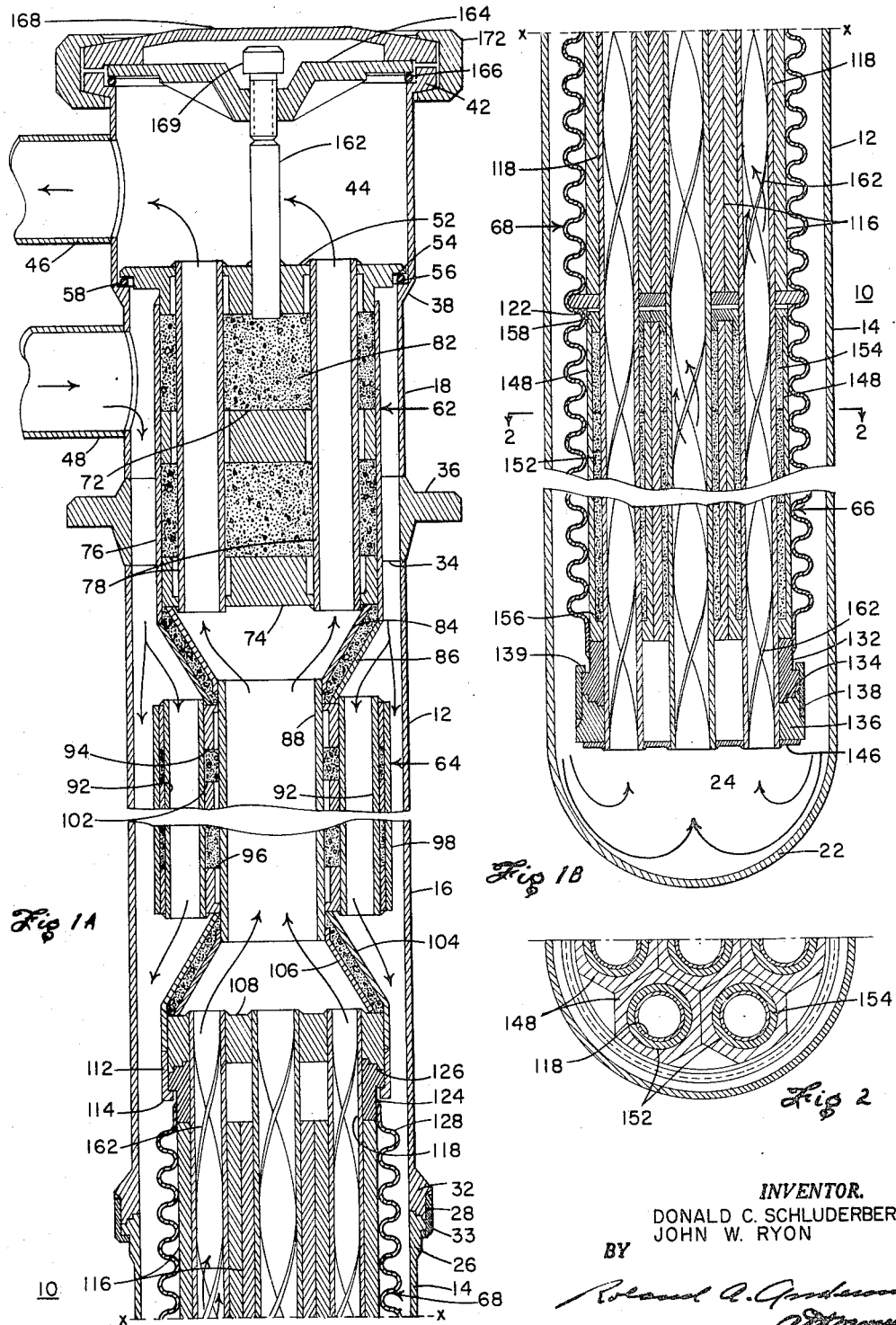
INVENTOR.
DONALD C. SCHLUDERBERG
JOHN W. RYON
BY

United States Patent Office 3,033,773
Patented May 8, 1962

3,033,773
SOLID GAS SUSPENSION NUCLEAR
FUEL ASSEMBLY
Donald C. Schluderberg and John W. Ryon, Lynchburg, Va., assignors to the United States of America as represented by the United States Atomic Energy Commission
Filed Mar. 29, 1960, Ser. No. 18,460
4 Claims. (Cl. 204—193.2)

The present invention relates to a fuel assembly for use in a gas-suspension reactor and more particularly to a fuel assembly in which a gas-suspension coolant withdraws the heat developed by the fuel elements.

Nuclear reactors of present design and construction utilize coolants which are either gas or liquid. Liquid coolants generally have excellent properties for this purpose but they also present problems having to do with high pressures, corrosion, mass transfer, and susceptibility to radiation damage. Gaseous coolants are poor heat transporters unless they are pressurized to a highly undesirable degree.

Experimental work has been conducted and it has been found that the heat transport and transfer capabilities of a gas-solid fluid (the so-called gas-suspension) is much better than gas when used alone. In addition, a gas-suspension has many of the advantages usually associated with liquid coolants while avoiding many of their disadvantages. In accordance with this invention there is provided a novel basic fuel assembly for use in a reactor of the gas suspension type, wherein there is utilized in a highly efficient fashion a solid suspension gaseous coolant for withdrawing the heat of the reactor and for maintaining the fuel elements themselves within permissible temperature ranges.

It is accordingly a first object of this invention to provide a fuel element for use in a gas suspension reactor.

It is another object of this invention to provide a fuel element assembly for use with a gas-suspension coolant and capable of withstanding differential thermal expansions of its various portions thereof.

Another object of this invention is the provision of a fuel assembly for use in a gas suspension reactor having therein its own reflector and shielding regions to limit or prevent neutron streaming and thus provide effective isolation for the reactive portion of the fuel element assembly.

Other objects and advantages of this invention will hereinafter become more evident in the light of the following description and with reference to the attached drawing in which:

FIGS. 1A and 1B together show an elevation view in section of a fuel element assembly constructed in accordance with the principles of this invention; and FIG. 2 is a view along 2—2 of FIG. 1.

By gas-suspension reactor is meant a reactor in which a gas such as helium with solid particles such as graphite are suspended therein and this suspension is utilized to extract the heat of reaction developed in the reactive portions of the assembly.

Making reference to FIGS. 1A and 1B which are divided along section X—X there is shown a fuel element assembly 10 constructed according to the principles of this invention and consisting of a pressure tube 12 which is comprised of a lower section 14, an intermediate section 16, and an upper section 18. Tube 12 is of bi-metallic construction with lower section 14 of zircaloy, magnesium, aluminum, or beryllium alloy, and the remainder of stainless steel. Section 14 is not of stainless steel because it is located in the reactive region of the assembly. Pressure tube 12 is cylindrical in section and extends the whole length of fuel assembly 10.

Lower section 14 is enclosed at its bottom by a semi-spherical closure 22 enclosing therewithin a lower plenum 24. The upper end of section 14 terminates in a flange 26 which forms a joint 28 with a flange 32 at the bottom of intermediate section 16. A clamping ring 33 may be used to insure proper sealing. Intermediate section 16 extends upwardly and terminates at 34. Top section 18 is separated from intermediate section 16 by a flange member 36 which is used to support and suspend fuel element assembly 10 into the interior of a reactor vessel (not shown). Flange 36 may form along with the flanges of similar fuel assemblies 10 structure for suspending them into a critical assembly, as is understood in the art. A suitable coolant may flow around and between assemblies 10 as well as through. Outside of assemblies 10 in the active core region, graphite blocks (not shown) could be used as a moderating material or these could be replaced with $D_2O$ in a calandria type containment through which pressure tubes 12 would be inserted. Flange 36 may be circular in section or have any other convenient shape which would make it useful in supporting the assembly.

Top section 18 of pressure tube 12 extends from flange member 36 and expands into a larger diameter at 38 for a purpose to be later described and terminates at its uppermost edge in a flange 42. An upper plenum 44 is formed adjacent or within the top of tube section 18 to which is connected an outlet 46 for the coolant. An inlet 48 is connected into pressure vessel section 18 above flange member 36 as illustrated.

The internals of fuel element assembly 10 are suspended within pressure tube 12 from an upper solid shield plate member 52 which is provided with a shoulder 54 resting on an abutment 56 formed by tubular section 18 at 38. This permits the use of a low pressure seal ring 58 which acts to separate the inlet solid gas-suspension coolant from the outgoing coolant. The internals of fuel assembly 10 consist of alternating shield plug sub-assemblies 62 and 64 and reactor core sub-assemblies 66 and 68. Sub-assemblies 62 and 64 are used alternately to form shielding within each pressure tube. While only two alternating shielding sections are shown, it is understood that several alternating sections of shielding having different coolant flow arrangements designed to prevent neutron streaming may be used. This shielding complements shield plug structure (not shown) external to each pressure tube to form the top portion of the reactor shield structure, as is understood in the art. Sub-assembly 66 comprises the active fueled portion of the reactor core. Sub-assembly 68 is located above sub-assembly 66 and comprises a part of the top portion of the core reflector located inside each pressure tube 12.

Shield plug sub-assembly 62 consists of the shield plate 52 previously described and additional cylindrical solid shield plates 72 and 74 which are joined together into a compact unit by a cylindrical thin walled tube 76 as illustrated. A plurality of tubes 78 extend through upper shield plug-assembly 62 for passing therethrough the solid gas-suspension coolant upwardly in the direction indicated by the arrows. The space within upper shield plug sub-assembly 62 contained by cylindrical tube 76 and surrounding tubes 78 is filled with a suitable shielding material such as metallic hydride 82. Zirconium hydride is one hydride suitable for this application.

Shield plug sub-assembly 64 is connected to sub-assembly 62 by a pair of funnel shaped elements 84 and 86 which are shown connected at their upper ends to the lower shield plate 74 and the outer cylindrical tube 76 respectively. Within the annular space formed by funnel members 84 and 86 is filled with the metallic hydride shielding material mentioned above. Shield plug sub-assembly 64 consists of a central tubular hollow cylindrical vertically extending element 88 surrounded in annular fashion by a plurality of smaller diameter tubes 92 supported at their opposite ends by upper and lower shield plates 94 and 96 respectively. Sub-assembly 64 is enclosed by an outer cylindrical tube 98 which connects the upper and lower shield plates 94 and 96. Located within tube 98 and surrounding tubes 88 and 92 the shielding material such as the metallic hydride described above may be used. Intermediate shield plates 102 are spaced within sub-assembly 84 as required by shield design considerations.

Core reflector sub-assembly 68 is located directly above subassembly 66 and is supported thereunder from sub-assembly 64 by a pair of funnel shaped elements 104 and 106 respectively which are joined at their narrowest ends at the top thereof by lower shield plate 96 and tube 88 respectively. The annular space formed by funnel elements 104 and 106 is filled with a suitable hydrogenous shielding material such as described previously. The bottom edges of elements 104 and 106 are connected to a top plate 108 of sub-assembly 68 and to an outer cylindrical tube 112 having a bottom lip 114 which supports reflector sub-assembly 68 and the reactive core sub-assembly 66 further below. Sub-assembly 68 consists of a plurality of hexagonal graphite elongated vertically extended members 116 through which are passed a plurality of cylindrical thin walled members 118 which extend through sub-assembly 66 as will be further described. The shape of graphite members 116 is similar to the shape of members 148 in sub-assembly 66 to be described further below. A flat cylindrical plate supports graphite members 116 at the bottom thereof. An upper cylindrical sealing member 124 spaces the top of graphite elements 116 from the top plate 108 and forms a sealing joint 126 with plate 108 and is supported also by lip 114 as illustrated. Sealing member 124 also has connected thereto the top end of a bellows or shell 128 which is corrugated and extends down to a lower plug 132 similar to plug 124. Graphite plate 122 fits into one of the corrugations of shell 128 so that plate 122 will provide the proper support for graphite elements 116 as shell 128 is contracted or elongated in accordance with the thermal expansions taking place in assembly 10. As is shown in the drawing, shell 128 extends downwardly to enclose reactive core sub-assembly 66 terminating at the lower plug 132 already described. Plug 132 is part of the lower sealing and supporting arrangement for the internals of fuel element assembly 10 forming a seal 134 with a bottom cylindrical plate 136 which are joined together by an annular clamp 138 which is provided with an upper lip 139 to engage with an appropriate shoulder on plug 132 and may be welded to bottom member 136 as is illustrated. Shell 128 is connected by appropriate means as by welding at its ends to members 124 and 132 to form a unitary sealed unit. A bottom flat plate 146 closes off the bottom of reactor core sub-assembly 66 through which the flow tubes 118 pass and open into lower plenum 24.

Reactive core sub-assembly 66 within corruguated shell 128 consists of a plurality of elongated hexagonal graphite members 148 which are provided with cylindrical openings 152 surrounding and spaced from tubes 118. Within the annular space between openings 152 and tubes 118 are annular fuel pellets 154 consisting of uranium carbide (UC). Each of the graphite blocks 148 is provided at its bottom end with an inner annular lip 156 to support fuel pellets 154. A graphite plate 158 closes off the top of graphite blocks 148 clamping there within the annular spaces the fuel pellets 154. Plate 158 is spaced from the support plate 122 to permit the movement of sub-assembly 68 in accordance with thermal expansion which takes place. Additional support plates 122 (not shown) may be located at the base of other assemblies of fuel containing graphite blocks 148 comprising reactor core sub-assembly 66. The extreme upper and lower portions of the active core section of sub-assembly 66 constitute a portion of the core reflector, where no fuel is contained. The fuel region between these reflector regions would comprise approximately 95% of the active core.

Within tubes 118 there are provided spiral ribbon elements 162 as illustrated to insure the promotion of turbulence of the gas suspension as it flows up through tubes 118 and thereby improving the heat transfer characteristics of the system. Turbulence promoters and tubes 118 would be of similiar material as shell 128, such as zircaloy, magnesium, aluminum or beryllium alloy. As tubes 118 and turbulence promoters 162 are of very thin construction, the relatively high neutron cross-section of the alloys suggested will not produce a serious effect upon the neutron economy of the reactor. Furthermore, the comparatively low pressure of the gas-suspension coolant would minimize the thickness of these tubes thereby minimizing the neutron loss as just mentioned.

As has already been noted, the internals of fuel element assembly 10 are supported from the upper plate member 52. Plate 52 rests on the shoulder 38 as already explained. For lowering the internals down into vessel 12 and for raising the internals when desired out of vessel 12 there is a cylindrical pick-up stem 162 extending upwardly from and rigidly attached to plate 52. Stem 162 may be welded or otherwise conveniently attached. The top of stem 162 is engaged with a closure seal plate 164 which rests through an annular seal 166 on top cylindrical section 18 by way of a shoulder on flange 42. Closure seal plate 164 is clamped down by a pressure tube closure 168 which encloses the top grasping knob 169 of stem 162. A closure clamp 172 clamps the entire top assembly in place. Except as otherwise indicated, stainless steel may be used as the material for the various members unless indicated more specifically.

The gas-suspension coolant flows through fuel element assembly 10 in the following manner. The fluid enters the vessel 12 by way of inlet 48 and passes downward through the annular space between sub-assembly 62 and vessel 18 and into or around the plurality of annularly spaced tubular members 92. After passing through alternate sub-assemblies 62 and 64, the gas flows downwardly and passes into the annular space surrounding corruguated shell 128 into lower plenum 24 where the fluid makes a 180° turn and passes upwardly through the tubes 118 in bottom plate 146. The fluid flows through tubes 118 passing through the reactive core sub-assembly 66 where the fluid picks up the heat of fission and leaves core reflector sub-assembly 68 at the top thereof and passes through funnel 106 into a flow passage consisting alternately of the central tube 88 and tubes 78 in sub-assemblies 64 and 62 respectively. The suspension continues its passage in this manner to upper plenum 44 and then out through outlet 46.

A complete discussion of gas-suspensions for use in a reactor is given in a report, BAW-1159, "Gas Suspension Coolant Project—Final Report," which will be made available by the Technical Information Service Extension of the U.S. Atomic Energy Commission.

It is thus seen that there has been provided a suitable fuel element assembly capable of utilizing in an efficient manner a gas-suspension coolant and moderator. The design is of compact, basic simplicity and is convenient for withdrawing the fuel element internals for repair, modification or replacement. In addition, adequate provision is made for the proper shielding of the reactive core portion of the fuel assembly, without excessively adding to the weight and massiveness of the assembly. In short, there has been provided an assembly of unique design to utilizing to the fullest extent possible the advantages of a gas-suspension coolant.

Of course, it is understood that only a preferred embodiment of this invention has been illustrated and is described and that many other improvements, changes and modifications may be made without departing from the principles of this invention.

We claim:
1. A nuclear fuel assembly comprising a tubular member extending vertically and closed at its top and bottom ends, outlet means for gas suspension coolant from said member adjacent the top thereof, inlet means for coolant into said member below said outlet means, means located between said inlet and outlet means for maintaining separation of incoming and leaving coolant, first sub-assembly means suspended from said separation means within said member containing fissionable fuel pellets, means for directing said coolant from said inlet means down said member and around said first sub-assembly means, said first sub-assembly means having vertically extended passageways to receive from the bottom and direct upwardly said coolant toward said outlet means for withdrawing the heat of fission, said fuel pellets surrounding said passageways, neutron moderating material surrounding said fuel pellets, and said passageways containing means for promoting turbulence of said gas-suspension coolant in order to improve the heat transfer between the walls of said passageways and said coolant.

2. The nuclear fuel assembly of claim 1 in which second sub-assembly means is located above said first sub-assembly means, said second sub-assembly means containing neutron reflecting material and passageways aligned with said first sub-assembly means passageways to direct said coolant upwardly.

3. The nuclear fuel assembly of claim 2 in which expansible means encloses said first and second sub-assembly means to permit thermal growth of said sub-assembly means, said first and second sub-assembly means being spaced from each other to permit their relative independent expansion.

4. The nuclear fuel assembly of claim 3 in which shielding means extend between and connect said separation means and said sub-assembly means, said shielding means having passageways extending through said separation means to direct flow of coolant toward said outlet means, said shielding means having alternating distribution of its passageways to prevent neutron streaming from said first sub-assembly means.

References Cited in the file of this patent

UNITED STATES PATENTS

| | | |
|---|---|---|
| 2,949,416 | Wheelock | Aug. 16, 1960 |

FOREIGN PATENTS

| | | |
|---|---|---|
| 1,023,828 | Germany | Feb. 6, 1958 |
| 1,162,270 | France | Apr. 8, 1958 |
| 1,064,652 | Germany | Sept. 3, 1959 |
| 820,579 | Great Britain | Sept. 23, 1959 |